Aug. 25, 1959 J. A. EPSTEIN 2,901,357
PACKAGED BEVERAGE PRODUCTS AND METHODS OF MAKING THEM
Filed Sept. 10, 1958
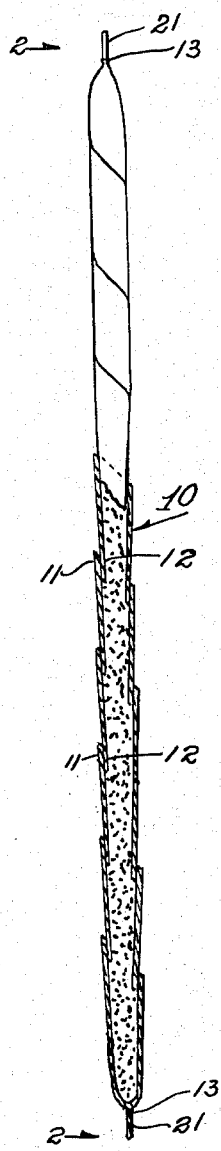
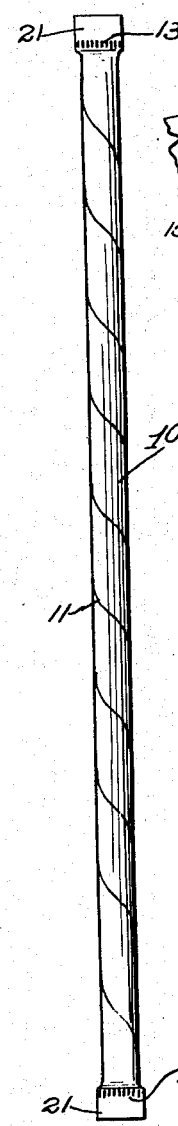
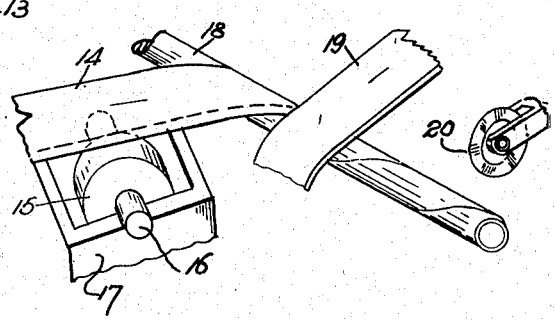
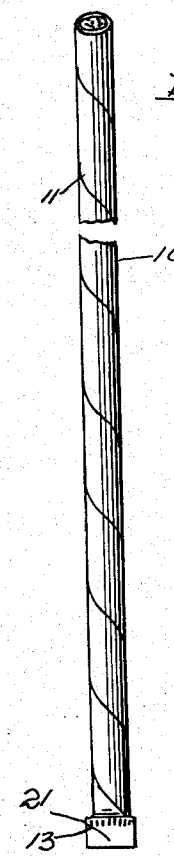
INVENTOR.
Jack A Epstein,
BY Robert H. Wendt,
Attorney United States Patent Office 2,901,357
Patented Aug. 25, 1959

2,901,357

PACKAGED BEVERAGE PRODUCTS AND METHODS OF MAKING THEM

Jack A. Epstein, Skokie, Ill.

Application September 10, 1958, Serial No. 760,236

1 Claim. (Cl. 99—171)

The present invention relates to packaged beverage products and methods of making them, and is particularly concerned with straws used for soft drinks and for packaging soft drinks of the type made by the admixture of dextrose, citric acid, artificial coloring, and artificial flavoring in the form of a powder, which is to be confined in the straw and used by breaking off the ends of the straw.

One of the objects of the present invention is the provision of an improved beverage straw which is filled with the beverage powder and sealed at both its ends in such manner that the structure is simple, inexpensive, capable of economical manufacture with a minimum amount of machinery, and adapted to be packaged economically and attractively without any more difficulty than the packaging of hollow straws.

Another object of the invention is the provision of an improved beverage powder container which is adapted to preserve the moisture content of the powder, which is preferably in the form of crystals containing the moisture of crystallization, but which is also adapted to prevent deterioration of the powder by the ingress of additional moisture, which might otherwise make the powder lumpy or solid or cause it to adhere to the inside of the container.

Another object of the invention is the provision of improved methods of making such packaged beverage products, which result in a product that is simple in structure, having no external projections that interfere with packaging, and which may be used, after tearing off the ends, as a straw for stirring and consuming the beverage, or which permit the immediate consumption of the flavored crystals by removing one end and discharging the powder into the mouth of the consumer.

Other objects and advantages of the invention will be apparent from the following description and the accompanying drawings, in which similar characters of reference indicate similar parts throughout the several views.

Referring to the single sheet of drawings accompanying this specification,

Fig. 1 is a side elevational view of a package embodying the invention, shown in partial section to expose the contents and structure, the proportions being exaggerated to show the details;

Fig. 2 is a similar side elevational view taken from the left side of Fig. 1 on the line 2—2, looking in the direction of the arrows;

Fig. 3 is a fragmentary view in perspective of one of the straws after one end has been closed;

Fig. 4 is a diagrammatic fragmentary view showing the method of wrapping the straw and applying colored edible glue to the strip of paper by passing over a roller immersed in a container of the glue, wrapping the paper strip upon a mandrel, and applying pressure to the joint by means of a belt, resulting in the formation of a colored straw, the joints of which are more tightly glued than those of the prior art, and the joints of which are penetrated by the colored glue in such manner as to produce a spiral striping effect on a finished straw.

Referring to Figs. 1 and 2, the beverage powder package is indicated in its entirety in Fig. 1 by the numeral 10; and it comprises a spirally wrapped paper straw, the overlapping portions 11 and 12 of which are glued together by means of an artificially colored edible glue, producing a straw similar to the straws currently in use at soda fountains, except that the present straw has the joints between the overlapping portions 11 and 12 more tightly glued together and colored by subjecting these joints to pressure in the course of the wrapping of the straw.

The straws may be of any size, but are preferably ten and one-half inches in length and one-fourth of an inch in diameter, and are coated with wax or paraffin both inside and out.

The straw has one of its ends sealed first by application of heat and pressure applied by oppositely disposed rollers, having knurling ribs formed therein, the rollers flattening out and sealing the ends of the tube together over a substantial area with an especially tight line of seal, having inter-engaging knurling formations indicated at 13, 13.

In the course of the manufacture of the straws one end is first sealed; and the straw is then filled with a crystalline powder of dextrose, citric acid crystals artificially colored and artificially flavored, in the form of a dry, flowable powder.

This powder should be non-hygroscopic, being in crystalline form, in which its water is in the form of water of crystallization; and the crystals are dry, but fully satisfied as to water absorption.

The other end of the tube is then sealed in the same manner, making a completely air-tight and water-tight enclosure of the beverage powder, which preferably has a minimum air space at the end, the powder being packed and the tubes fully filled by subjecting them to vibration in some forms of the invention.

The method of making the beverage products may be described briefly as follows. A suitable paper for making straws is provided with a coating of glue on the under side of one edge of the paper strip 14 by passing over a glue coated roller 15 rotatably mounted upon an axis 16, and immersed in a container 17 having a supply of artificially colored glue.

The paper strip 14, having a coating of glue on the under side of one edge is spirally wrapped on a rotating mandrel 18 and subjected to the sliding pressure action at the joints 11, 12 by a moving belt 19. The pressure applied to the paper at the glued joints causes the glue to penetrate into the paper, which is more darkly colored with the glue at the joints, producing a straw which is stronger, and which is spirally decorated with stripes of a darker hue.

The mandrel 18 is preferably tapered a few thousandths so that the straw may be continuously discharged from the right end of Fig. 4, where the straws are cut into suitable lengths by rotating cutting discs 20 applied to the straw at regular intervals of time, resulting in the discharge of regular lengths of the straw.

The straws may be subjected to drying or curing after their formation by using a heated drying atmosphere; and they may be coated inside and out with paraffin or wax by being immersed over their full length and area in the heated wax or paraffin, which adheres to the straws and solidifies thereon, coating them inside and out with the waterproof material.

The next step in the manufacture of the package is the sealing of one end by passing the end through flattening rollers having inter-engaging knurling formations, the rollers being heated to apply heat and pressure, which causes the opposite sides to become plane and parallel and to adhere to each other, effecting a complete closure.

The point of flattening 21 at each end provides a point at which the closed straw may be most readily torn off because the flat portion can be grasped tightly between the thumb and forefinger of one hand, while the adjacent round portion is grasped between the thumb and forefinger of the other hand, and a quick tear is easily made, moving the hands in opposite directions transversely to the straw.

The open end is then preferably brought to a more perfect round by means of the fingers, pressing on the opposite sides as required.

After one end of the straw is sealed, it is preferably filled with crystals of the dry, flowable powder, previously described; and the other end of the tube is sealed in the same manner. The powder may be compacted by jarring the closed ends of the tube against a suitable base or by vibrating the assembly of straws and powder during the course of filling; and the filling may be most readily accomplished by placing a large number of straws which are closed at their lower ends side by side in a box having a coarse sieve or grating for its bottom for passing the powder, which falls between the straws, the box being filled with a suitable supply of the powder above the open ends of the straws, which are arranged side by side, completely filling the box, presenting the open ends upward.

One side of the straw container may be open and have its upper edge flush with the top of the straws so that a suitable doctor blade may wipe the powder across the tops of the open straws, filling them completely, and wiping the excess over the side of the box.

The present beverage powder filled straws are attractive, strong, waterproof, and their content is readily accessible by tearing off the flattened ends, after which the straws may be used in the usual manner to stir the beverage and sip it through the straw.

The crystalline powder is immediately soluble in water and produces a palatable beverage of high food content. The crystalline powder content may also be eaten without using water by opening one end and permitting the straw to discharge the powder into the mouth.

The structure of the present packages is simple, adapted to be manufactured economically; and the colored straws may be manufactured more cheaply than straws which are made of colored paper.

The filled straws may be stored for a long period of time without deterioration; and upon opening, the crystalline powder will still be found dry and flowable so that it runs out of the straw readily into a glass of water.

The spiral colored stripes on the straws may be indicative of the flavor of the content, purple indicating grape, red indicating cherry, green indicating lime or lemon, orange indicating orange, and brown indicating root beer or cola powder.

It will thus be observed that I have invented improved packages for beverage products in the form of a straw sealed at both ends, and containing a crystalline beverage powder, the ends being merely flattened and sealed by heat and pressure. These ends do not interfere with each other or with those in adjacent packages because the flat portions may be oriented in different directions.

The methods of manufacture of these products are also simple and effective, and result in a product which is stronger, which can be colored more economically, and which has an ornamental spiral striping of the same color as the body, but having a deeper hue.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

A paper straw package for flavored and colored, water soluble, flowing powder for beverages, and for use in stirring and sipping beverage made therefrom, comprising a helically wrapped narrow cylindrical paper straw having successive helical turns of a paper strip provided with overlapping portions adhesively secured to each other at the overlapping portions, forming a single walled paper sipping straw, said straw being waterproofed inside and out by a coating of wax over all, said straw having both of its ends integrally closed by a closure formed of the paper of the end portions of the straw, the sides of which are brought together and adhesively engaged with adjacent end portions of the straw to close said ends without lateral projections interfering with other straws in packing the straws, said straws alone forming a substantially rigid container without additional reinforcement, supporting and containing a filling of water soluble, flowing powder for beverages, which flows entirely out of the end of the straw after one end is torn off by a child to make the beverage powder available for mixing with water, the straw being available for stirring the powder in the water, and the other end being torn off to use the straw in sipping the beverage, the said powder being colored in a manner suggestive of its flavor, and the adhesive securing the successive turns together being colored in a similar color and pressed into the paper, impregnating and coloring the overlapping portions in such manner that the package color indicates the flavor of its content.

References Cited in the file of this patent
UNITED STATES PATENTS

| | | |
|---|---|---|
| 362,727 | Divine | May 10, 1887 |
| 441,846 | Hurbut | Dec. 2, 1890 |
| 1,254,115 | Brand | Jan. 22, 1918 |
| 1,888,898 | Wickel | Nov. 22, 1932 |
| 1,996,203 | Hollingworth | Apr. 2, 1935 |
| 2,102,920 | Savage | Dec. 21, 1937 |
| 2,745,753 | Ayres | May 15, 1956 |